United States Patent [19]

Ayabe et al.

[11] Patent Number: 4,565,918

[45] Date of Patent: Jan. 21, 1986

[54] HEATING CIRCUIT FOR A THERMAL RECORDING-PEN

[75] Inventors: Hideaki Ayabe; Takeshi Toyosawa; Shigeo Ikeda; Ken-Ichiro Ohta, all of Tokyo, Japan

[73] Assignee: Graphtec Kabushiki Kaisha, Tokyo, Japan

[21] Appl. No.: 472,933

[22] Filed: Mar. 7, 1983

[30] Foreign Application Priority Data

Jun. 28, 1982 [JP] Japan ................. 57-109960

[51] Int. Cl.[4] ............................................. H05B 1/02
[52] U.S. Cl. ................................... 219/499; 219/216; 219/501; 346/76 PH
[58] Field of Search .............. 219/497, 499, 494, 501, 219/216, 216 PH; 346/76 R, 76 PH

[56] References Cited

U.S. PATENT DOCUMENTS

| | | | |
|---|---|---|---|
| 2,644,738 | 7/1953 | Gardner | 346/76 R |
| 3,857,017 | 12/1974 | Whittier | 219/504 |
| 3,917,993 | 11/1975 | Picmaus et al. | 219/499 |
| 4,092,649 | 5/1978 | Miller | 346/76 R |
| 4,139,854 | 2/1979 | Walker | 346/76 R |

Primary Examiner—M. H. Paschall
Attorney, Agent, or Firm—Spensley Horn Jubas & Lubitz

[57] ABSTRACT

In an automatic recording instrument having a thermal recording-pen to record on a heat sensitive recording-paper, an operational amplifier output supplies the heating current to the thermal pen through a resistor. A non-linear transfer element receives the output voltage of the amplifier and delivers a voltage having a predetermined non-linear relation to its input. The voltage difference between the output of the non-linear transfer element and the junction point of the thermal pen to the resistor is feedback connected to the input of the amplifier. When the relative velocity between the pen and the paper is increased, the input voltage of the amplifier is increased to increase the output voltage, and when the output voltage is increased, the resistance of the thermal pen is increased to balance to the output of the non-linear transfer element for reducing the input to the amplifier. This means that the heated temperature of the thermal pen is raised when the pen moves faster on the paper and a constant thickness of the recording is maintained in a wide range of the relative velocity between the pen and the paper.

10 Claims, 11 Drawing Figures

HEATING CIRCUIT FOR A THERMAL RECORDING-PEN

This invention relates to an automatic recording instrument, and more particularly to an instrument which has a thermal recording-pen to record on a heat sensitive recording-paper.

In an automatic recording instrument, the relative velocity V between the recording-pen and the recording-paper varies in a wide range. To keep the quality of the recorded trace homogeneous in a thermal type automatic recording instrument through all the variable range of the relative velocity V, the heating power of the thermal recording-pen must be changed in accordance with the relative velocity V.

Therefore, in heretofore known thermal type automatic recording instruments, the information of the relative velocity is detected, and the heating power of the recording-pen is controlled by the detected information.

The information of the relative velocity V is usually detected by two components $V_x$ and $V_y$ which are perpendicular to each other, and the relative velocity V must be calculated from these two components. This calculation and the control of the heating power by this calculated velocity requires a complicated circuit.

There is known a new control method which can simplify this complicated circuit. In this new control method, the heated temperature T of the thermal recording-pen is feed-back-controlled at a predetermined value.

As the resistance $R_p(T)$ of a thermal recording-pen is determined by the temperature T of the recording-pen, the resistance $R_p(T)$ is feedback-controlled at a predetermined value by a resistance bridge. The resistance $R_p(T)$ composes a bridge network with three other resistors having resistance values $R_3$, $R_4$, $R_5$ respectively. The balancing point of this bridge circuit is set at $$R_p(T)/R_3 = R_4/R_5 \tag{1}$$

The voltage source of this bridge is supplied from the output of the operational amplifier, and the current flowing through the recording-pen from the voltage source generates heat in the recording-pen to keep the heated temperature at T which maintains the resistance of the recording-pen at $R_p(T)$. The error voltage, or the unbalanced output of the bridge circuit is feedback-connected to the input of the operational amplifier. A sufficiently large gain of the operational amplifier can maintain the feedback input at a sufficiently small value, which means that the equation (1) is always satisfied and that $R_p(T)$ is maintained constant.

Therefore, in this new control method, the information of the relative velocity V is not necessary to keep the heated temperature of the recording-pen at a predetermined value in a wide range of the relative velocity V.

But, when the relative velocity V varies in a wide range, a constant temperature thermal recording-pen does not draw a constant thickness line, and the temperature of the recording-pen must be increased for an increased relative velocity to draw a constant thickness line.

Therefore, even in a thermal type recording instrument in which the temperature of the thermal recording-pen is feedback-controlled, the information of the relative velocity V is necessary to compensate the heated temperature of the recording-pen.

Therefore, an object of the present invention is to provide a heating circuit for a thermal recording-pen, which feedback-controls the heating of the recording-pen with no external control signal to obtain a homogeneous thickness of the record on a heat sensitive recording-paper in all the environmental circumstances of the recording-pen.

Another object of the present invention is to provide a heating circuit for a thermal recording-pen which feedback-controls the heating of the recording-pen with a very small power consumption.

In accomplishing these and other objects, there is provided in accordance with the present invention, a resistance bridge circuit in which one arm is composed of the thermal recording-pen and at least one other arm is composed of a non-linear element. The voltage source of the bridge circuit is supplied from an operational amplifier output, and the unbalanced output of the bridge circuit is feedback-connected to the input of the operational amplifier.

When the relative velocity V is increased, the input voltage of the operational amplifier is increased to increase the output voltage, and when the output voltage is increased, the resistance of the recording-pen is increased to balance the bridge against the non-linear element. This means that the heated temperature of the recording-pen is increased when the recording-pen moves faster on the paper and a constant thickness of the recording is maintained in a wide range of the relative velocity V.

Other and further objects, features and advantages of the invention will appear more fully when the following description is read in connection with the accompanying drawings in which same reference characters refer to same or similar parts throughout.

Figure 1:
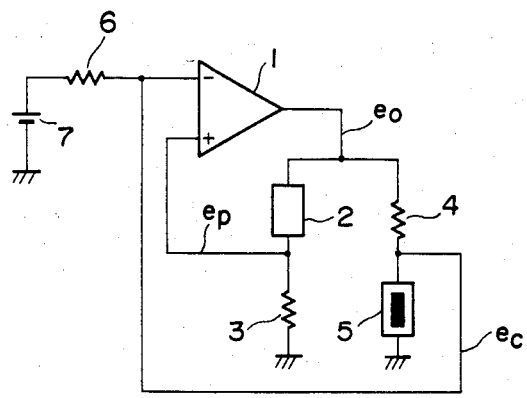
FIG. 1 is a block diagram illustrating an embodiment of this invention.

Referring now to FIG. 1, there is shown a heating circuit for a thermal recording-pen where 1 is an operational amplifier and 2 is a thermal recording-pen. An impedance bridge is formed with the thermal recording-pen 2, a resistor 3, a resistor 4, and a thermistor 5. The resistance of the thermal recording-pen 2 is denoted by $R_p(T)$ as mentioned in the foregoing paragraphs, and the resistance values of the resistors 3, 4 are denoted by $R_3$ and $R_4$ respectively. The resistance of the thermistor 5 is denoted by $R_5(e_c)$, where $e_c$ is the voltage across the thermistor 5, and $R_5(e_c)$ means that the resistance of the thermistor 5 is dependent on the impressed voltage $e_c$. The output voltage of the operational amplifier 1 is denoted by $e_o$.

This output voltage $e_o$ of the operational amplifier 1 should be in a range of a positive value in order to obtain a satisfactory feedback operation. The resistor 6 and the voltage source 7 are provided to keep this output voltage $e_o$ in a range of a positive value.

The resistance bridge is balanced at $$R_p(T)/R_3 = R_4/R_5(e_c) \qquad (2).$$

Because of a sufficiently large gain of the operational amplifier 1, the inout of the amplifier 1 is maintained at approximately zero irrespective of the change of the output $e_o$.

This means that the bridge is always approximately balanced, resulting in the change of $e_o$ and $R_5(e_c)$ for a change of $R_p(T)$.

The desired characteristic of the thermistor 5 to give a desired change of $R_p(T)$ in the variable range of the relative velocity V, can be experimentally determined. In this experiment for a thermal type recording instrument with a specified type of recording-paper, the heating circuit shown in FIG. 1 is used with the thermistor 5 substituted by a linear type variable resistor, the resistance of this variable resistor being denoted by $R_5$.

Figure 2:
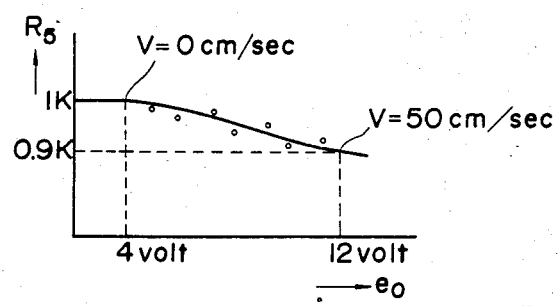
FIG. 2 is a graphic diagram illustrating an experimental result for determining the characteristic of the non-linear element in FIG. 1.

FIG. 2 shows the result of the experiment. The relative velocity V is changed in a range from V=0 cm/sec to V=50 cm/sec. At each value of V, the thickness of the recorded line is observed, and the value of $R_5$ is adjusted to give the best homogeneous thickness of the recorded line. The values of $e_o$ are plotted in relation to the values of $R_5$ which give the best homogeneous thickness of the recorded line at each value of V as the common parameter.

Figure 3:
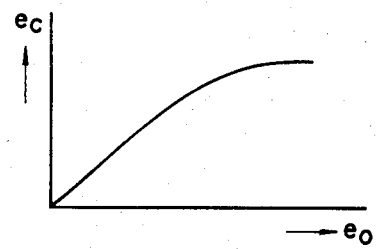
FIG. 3 is a graphic diagram illustrating the characteristic of the non-linear element determined by FIG. 2 and represented as a relation of the output voltage to the input voltage.

FIG. 3 is another representation of the experimental re-result, in which the voltage $e_c$ is plotted in relation to the voltage $e_o$.

When the thermistor 5 and the resistor 4 constitute a non-linear circuit having an input and output characteristic as shown by FIG. 3, it is apparent that the thermal recording-pen 2 records a best homogeneous thickness line in a wide range of V which is shown as the common parameter in FIG. 2. The characteristic shown by FIG. 3 is obtained also when the resistor 4 is a posistor with the resistor 5 being either a linear resistor or a thermistor. Further, an equivalent result is obtained when the resistor 3 is a thermistor.

Figure 4:
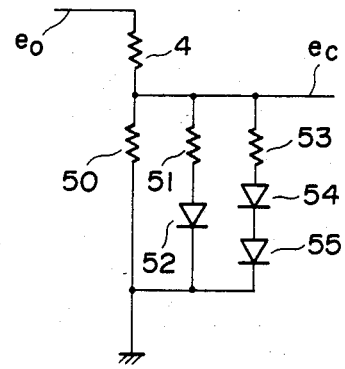
FIG. 4 is a circuit diagram illustrating an example of the non-linear element.

A non-linear transfer element having an input and output characteristic shown by FIG. 3 can be composed in various ways. FIG. 4 shows a circuit which approximates the characteristic of FIG. 3 by a connection of straight line segments. In FIG. 4, 50, 51, 53 are respectively fixed resistors, and 52, 54, 55 are respectively diodes. In the serial connection of the resistor 51 and the diode 52, for example, the diode 52 shows a large resistance in a range where $e_o$ is lower than a threshold value, and conducts with a small resistance in a range where $e_o$ is larger than the threshold value. Thus, this serial connection of the resistor 51 and the diode 52 contributes to a junction point of straight line segments in the $e_c$ to $e_o$ relation.

With a plural number of such serial circuits, each circuit including at least one diode, the connection of plural straight line segments in the $e_c$ to $e_o$ relation is constituted to approximate the characteristic of FIG. 3.

Figure 5:
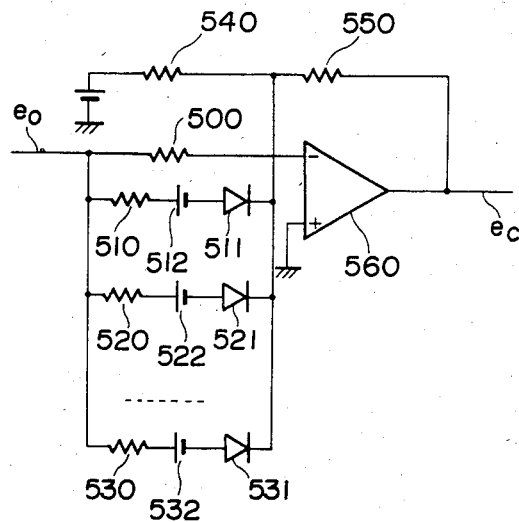
FIG. 5 is a circuit diagram illustrating another example of the non-linear element.

FIG. 5 shows another circuit which approximates the characteristic of FIG. 3 by a connection of straight line segments. In FIG. 5, 500, 510, 520, 530, ... 540, 550 are resistors respectively, 511, 521, 531, ... are diodes respectively, and 512, 522, 532, ... are voltage sources respectively. An operational amplifier is denoted by 560.

In the circuit of FIG. 5, the relation between the input $e_o$ and the output $e_c$ is determined by the feedback resistor 550 and the input resistance of the amplifier 560. The value of the input resistance changes stepwise because of the existence of the diodes 511, 521, 531 ... and the voltage source 512, 522, 532 .... Thus, a characteristic which is represented by a connection of straight line segments is obtained for the relation between $e_o$ and $e_c$.

Figure 6:
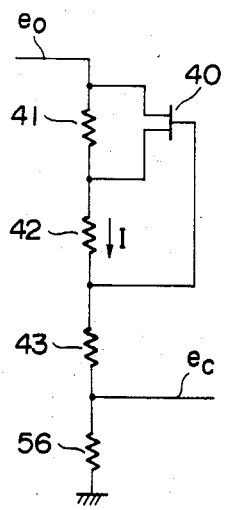
FIG. 6 is a circuit diagram illustrating still another example of the non-linear element.

In FIG. 6, 40 is an FET (field effect transistor), and 41, 42, 43, 56 are resistors respectively. The resistance drop through the resistor 42 by the current I is applied to the gate of the FET 40. The current I is controlled in a non-linear relation to the voltage $e_o$ by the FET 40, and the relation between $e_c$ and $e_o$ becomes as shown by FIG. 3.

Figure 7:
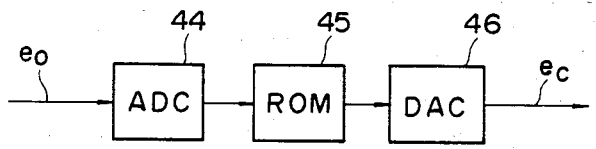
FIG. 7 is a circuit diagram illustrating still another example of the non-linear element.

In FIG. 7, 44 is an analog-digital converter (denoted by ADC), 45 is a ROM (read-only-memory), and 46 is a digital-analog converter (denoted by DAC). The analog voltage $e_o$ is converted to a digitial signal by the ADC 44, the ROM 45 gives the transfer characteristic $e_o - e_c$ to the input digital signal, and the output of the ROM 45 which is a digital signal representing $e_c$ is converted to an analog voltage $e_c$ by the DAC 46. The ROM 45 can be substituted by a logic circuit having the same transfer characteristic.

Figure 8:
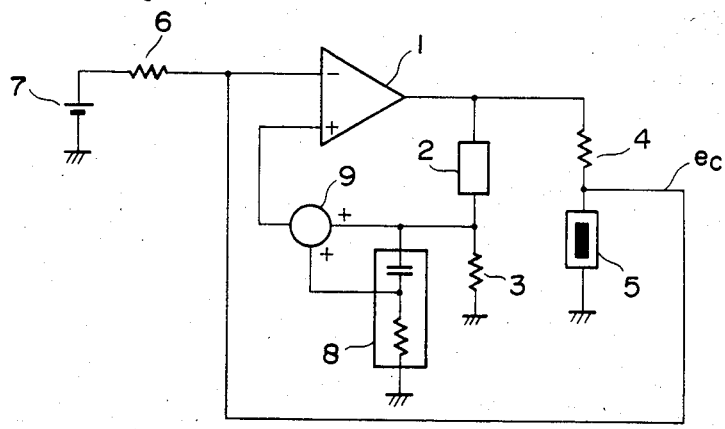
FIG. 8 is a block diagram illustrating another embodiment of this invention.

In FIG. 8, there is shown another embodiment of this invention, in which 8 is a differentiating circuit and 9 is an analog adder. In the feedback circuit to the operational amplifier 1 from the potentiometer composed of the thermal recording-pen 2 and the resistor 3, a time derivative of the output of the potentiometer is added to obtain a proportional plus derivative action for improving the response character of the feedback control.

In the foregoing paragraphs, embodiments of this invention have been described, in which a direct current voltage is used for heating the thermal recording-pen and in which the magnitude of the voltage is controlled to control the heated temperature of the thermal recording-pen. But, for heating a thermal recording-pen, a power source other than a direct current voltage source can be used, and for controlling the heated temperature of the pen, a variable other than the voltage amplitude can be controlled.

Now follows the description of another embodiment of this invention in which the power source is a train of rectangular pulses and the duty-cycle of the pulse train is controlled to control the heated temperature of a thermal recording-pen.

The pulse repetition period of a rectangular pulse train is denoted by $\tau_o$ and the pulse width of the rectangular pulse is denoted by $\tau$, representing the duty-cycle by $\tau/\tau_o$.

When the peak voltage of the rectangular pulse across the thermal recording-pen is denoted by $e_p$, the power dissipated by the pen is denoted by $$P = \frac{e_p^2}{R_p(T)} \cdot \frac{\tau}{\tau_o} \quad (3)$$

where $R_p(T)$ is the resistance of the thermal recording-pen. Thus, the power P can be controlled by controlling the duty-cycle.

The duty-cycle can be controlled either by PWM (pulse width modulation) where $\tau$ is modulated for a constant $\tau_o$, or by PFM (pulse frequency modulation) where $\tau_o$ is modulated for a constant $\tau$.

Figure 9:
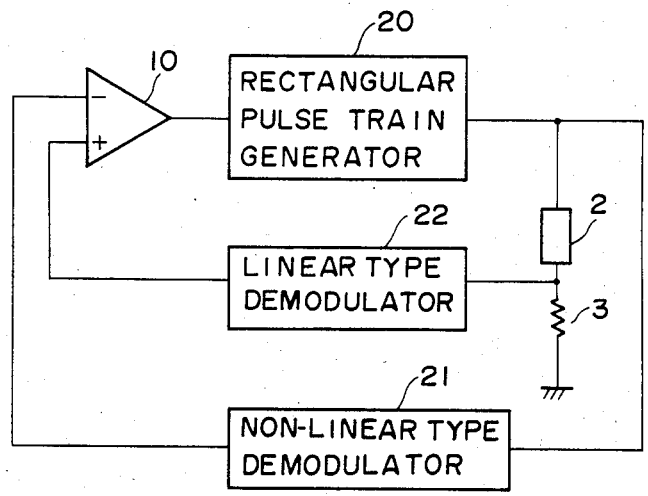
FIG. 9 is a block diagram illustrating still another embodiment of this invention.

FIG. 9 is a block diagram illustrating another embodiment of this invention, where 10 is an operational amplifier, 20 is a rectangular pulse train generator, the pulse width of the generated pulse train being controlled by the output of the operational amplifier 10. A non-linear type demodulator 21 generates a direct current voltage which has a non-linear transfer relation as shown by FIG. 3 to the pulse width of the input pulse train, and a linear type demodulator 22 generates a direct current voltage which is proportional to the pulse width of the input pulse train.

In the rectangular pulse train generator 20, the pulse repetition period $\tau_o$ and the peak voltage $e_o$, or the ratio of $e_o^2/\tau_o$ is maintained constant to prevent the change of P due to the fluctuation of the peak voltage $e_p$.

Since the PWM circuit in which the pulse width is modulated by a control voltage, is well known, the description on the rectangular pulse generator 20 is omitted.

Figure 10:
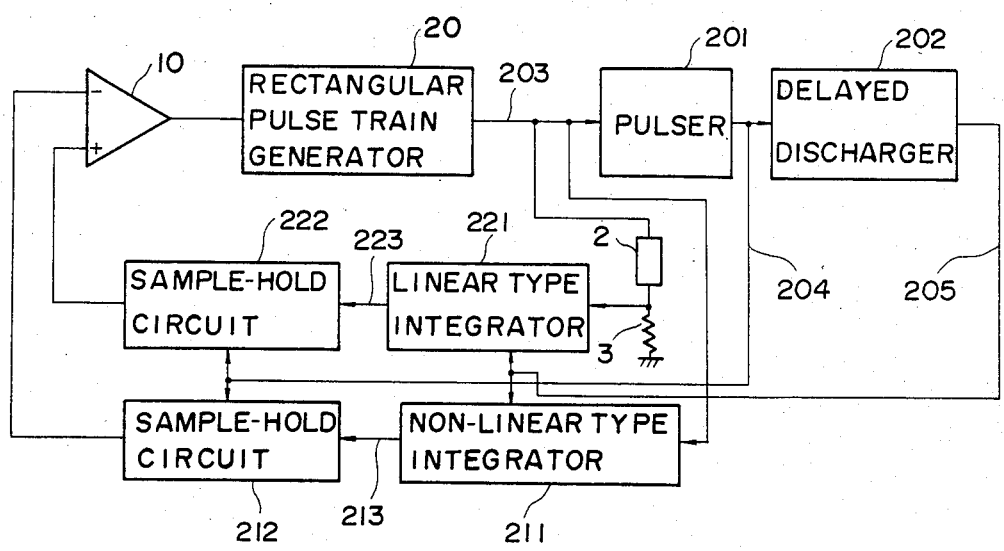
FIG. 10 is a block diagram illustrating a design example of the circuit shown by FIG. 9.

FIG. 10 is a block diagram illustrating an example of the non-linear type and linear type demodulators 21,22; and 201 is a pulser, 202 is a delayed gate pulse generator used as a delayed discharger. And 203 represents the output of the rectangular pulse train generator 20, 204 represents the output of the delayed discharger 202, 211 is a non-linear type integrator, 212 is a sample-hold circuit, 221 is a linear type integrator, 222 is another sample-hold circuit, 213 represents the output of the integrator 211, and 223 represents the output of the integrator 221.

Figure 11:
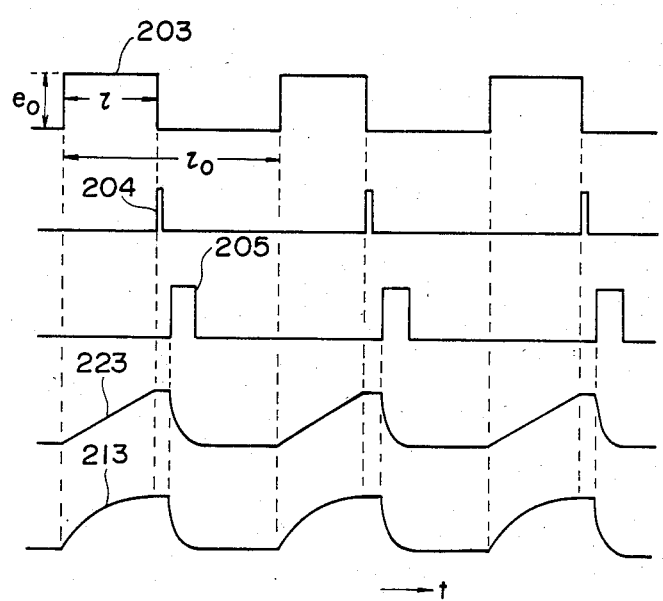
FIG. 11 is a performance time chart illustrating voltage waveshapes in FIG. 10.

FIG. 11 shows the waveshapes of the signals 203, 204, 205, 223, and 213 with time as the common abscissa. The rectangular pulse train generator 20 generates a pulse train 203 as shown in FIG. 11. In the linear type integrator 221, a capacitor (not shown in the drawing) is charged by a constant current source (not shown in the drawing) during the pulse width $\tau$, and the voltage across the capacitor increases as shown by the waveshape 223 in FIG. 11. In the non-linear type integrator 211, a capacitor (not shown in the drawing) is charged by a constant voltage source (not shown in the drawing) during the pulse width $\tau$, and the voltage across the capacitor increases as shown by the waveshape 213 in FIG. 11.

At the trailing edge of each rectangular pulse 203, a loading pulse 204 is generated. At each loading pulse 204, the instantaneous voltages of the waveshapes 223, 213 are transferred respectively to the sample-hold circuits 222, 212 to be held there until the next loading pulse. After this transfer to the sample-hold circuits 222, 212, the capacitors in the integrators 221, 211 are discharged by the delayed discharger 202.

Owing to a sufficiently large gain of the operational amplifier 10, the pulse width $\tau$ is so controlled as to balance the two input of the operational amplifier 10. The desired characteristic of the non-linear type demodulator 21 to give a desired change of $R_p(T)$ (the resistance of the thermal recording-pen) can be experimentally determined. In this experiment, the output of the non-linear type demodulator 21, which is the output of the sample-hold circuit 212 in the embodiment shown by FIG. 10, is substituted by a variable voltage source.

It is apparent that the circuit shown by FIG. 10 has a higher power efficiency compared with the circuit shown by FIG. 1. The operational amplifier 10 of FIG. 9 supplies only the control signal to modulate the rectangular pulse train generator 20, while the operational amplifier 1 in FIG. 1 must apply the heating power to the thermal recording-pen 2. The power loss in the rectangular pulse train generator 20 is very small, because the internal voltage drop can be made very small when the output 203 is at high voltage level, and the internal current can be made practically zero when the output 203 is at low voltage level.

Therefore, the circuit shown by FIG. 9 provides a heating circuit for a thermal recording-pen with a small power consumption.

We claim:

1. Heating circuit for a thermal recording-pen having a heating element which exhibits changes in resistance under certain printing conditions, comprising:
    a resistance bridge which includes one resistance arm composed of said heating element of the thermal recording-pen and three other resistance arms,
    an operational amplifier having an input and having an output which supplies power to said resistance bridge, and
    a feedback circuit connecting an output of said resistance bridge to the input of said operational amplifier;
    at least one of said three other resistance arms being a non-linear resistance characterized in that the resistance of the arm varies in a predetermined non-linear relation to the voltage across said arm, said relation being selected so that a resultant change in power provided by said operational amplifier output will cause a corresponding change in heating of said heating element to compensate for said exhibited change.

2. Heating circuit for a thermal recording-pen of claim 1 where a feedback circuit connects the sum of the detected resistance bridge output and its time derivative to the input of the operational amplifier.

3. Heating circuit for a thermal recording-pen comprising:
    a serial connection of a resistor and the heating element of the thermal recording-pen, said heating element exhibiting changes in resistance under certain printing conditions,
    an operational amplifier having an input and having an output which supplies power to said serial connection; characterized in that
    the output of said operational amplifier supplies an input voltage to a non-linear transfer network which compensates for said exhibited changes in the resistance of said heating element by providing an output voltage varying in a predetermined non-linear relation to its input voltage, and
    a feedback circuit connecting an output of said non-linear transfer network and a node of said serial connection to the input of said operational amplifier,
    wherein said circuit alters the extent of heating of said heating element in accordance with changes in relative velocity between said recording-pen and a print medium so as to achieve generally uniform print characteristics irrespective of such relative velocity.

4. Heating circuit for a thermal recording-pen of claim 3 where the feedback circuit connects a sum of the voltage difference between the voltage at an output of the non-linear transfer element and the voltage at the junction point of the serial connection and a time derivative of the voltage difference to an input of the operational amplifier.

5. Heating circuit for a thermal recording-pen of claim 3 wherein the non-linear transfer element comprises a plural number of parallel circuits, each parallel circuit including a switching element which conducts only in a voltage range over respectively predetermined threshold voltages, and a combined resistance of said parallel circuits changes at each switching element threshold voltage to simulate a predetermined non-linear transfer relation.

6. Heating circuit for a thermal recording-pen of claim 3 where the non-linear transfer element includes a transistor which is controlled by a voltage drop in said non-linear transfer element, wherein the current flowing through said transistor has a non-linear relation to a control voltage of said transistor.

7. Heating circuit for a thermal recording-pen of claim 3 where the non-linear transfer element comprises an analog-digital converter which receives an analog input voltage and generates a digital signal output representing the input voltage, a digital non-linear transfer element which receives the output of said analog-digital converter and generates a digital signal output having a predetermined non-linear relation to the received digital signal, and a digital-analog converter which receives the output of said digital non-linear transfer element and generates an analog voltage corresponding to the received digital signal.

8. Heating circuit for a thermal recording-pen comprising:
 a serial connection of a resistor and a heating element of the thermal recording-pen; characterized in that there are provided a pulse train generator to supply a duty-cycle modulated pulse train voltage to said serial connection,
 a linear type demodulator which receives the voltage at a junction point of said serial connection and generates a direct current voltage which has a linear relation to the duty-cycle of the input pulse train,
 a non-linear type demodulator which receives the output of said pulse train generator and generates a direct current voltage which has a predetermined non-linear relation to the duty-cycle of the input pulse train,
 an operational amplifier which modulates the duty-cycle of the output of said pulse train generator, and
 a feedback circuit which connects the output of said linear type demodulator and that of said non-linear type demodulator to the inverter and non-inverted input of said operational amplifier.

9. Heating circuit for a thermal recording-pen, said circuit altering the extent of heating of a heating element of said recording-pen in accordance with changes in relative velocity between said recording-pen and a print medium so as to achieve generally uniform print characteristics irrespective of such relative velocity, comprising:
 a resistance bridge which includes one resistance arm composed of said heating element of the thermal recording-pen and three other resistance arms,
 an operational amplifier having an input and having an output which supplies power to said resistance bridge, and
 a feedback circuit connecting an output of said resistance bridge to the input of said operational amplifier; characterized in that
 at least one of said three other resistance arms has a non-linear resistance characteristic in which the resistance of the arm varies in a predetermined non-linear relation to the voltage across said arm.

10. Heating circuit for a thermal recording-pen comprising:
 a serial connection of a resistor and the heating element of the thermal recording-pen, said heating element exhibiting changes in resistance under certain printing conditions,
 an operational amplifier having an input and having an output which supplies power to said serial connection; characterized in that
 the output of said operational amplifier supplies an input to a non-linear transfer network having an output voltage varying in a predetermined non-linear relation to its input voltage, said relation being selected so as to compensate for said exhibited changes in heating resistance of said recording-pen, and
 a feedback circuit connecting an output of said non-linear transfer element and a node of said serial connection to the input of said operational amplifier, and
 wherein said circuit alters the extent of heating of said heating element in accordance with changes in relative velocity between said recording-pen and a print medium so as to achieve generally uniform print characteristics irrespective of such relative velocity.

* * * * *